United States Patent
Lee et al.

(10) Patent No.: US 10,400,711 B2
(45) Date of Patent: Sep. 3, 2019

(54) ASSEMBLY INCLUDING AFT END IGNITER FOR ROCKET MOTOR

(71) Applicant: AGENCY FOR DEFENSE DEVELOPMENT, Daejeon (KR)

(72) Inventors: Sangyoun Lee, Daejeon (KR); Seunggyo Jang, Daejeon (KR); Hyonam Lee, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 67 days.

(21) Appl. No.: 15/870,525

(22) Filed: Jan. 12, 2018

(65) Prior Publication Data

US 2018/0202394 A1     Jul. 19, 2018

(30) Foreign Application Priority Data

Jan. 18, 2017  (KR) .......................... 10-2017-0008802

(51) Int. Cl.
*F02K 9/95* (2006.01)
*F02K 9/97* (2006.01)
(Continued)

(52) U.S. Cl.
CPC .................. *F02K 9/95* (2013.01); *F02K 9/08* (2013.01); *F02K 9/97* (2013.01); *F42B 3/04* (2013.01); *F42C 19/0819* (2013.01); *B64G 1/403* (2013.01)

(58) Field of Classification Search
CPC ...... F02K 9/95; F02K 9/08; F42B 3/04; F42C 19/0819; B64G 1/403
(Continued)

(56) References Cited

U.S. PATENT DOCUMENTS 3,224,373 A * 12/1965 Kramer ............... F42C 19/0819
                                                                 102/202
3,729,935 A *  5/1973 Fletcher ................... F02K 9/95
                                                                 102/380
(Continued)

FOREIGN PATENT DOCUMENTS

KR        1994-0000847 A     7/1995
KR     10-2004-0009475 A     1/2004
(Continued)

OTHER PUBLICATIONS

KR10-2017-0008802 *Petition for Accelerated Examination*—dated Jan. 19, 2017 (without translation)—with prior art cited references: KR10-1192203B1, KR10-0668804B1, KR10-2004-0009475A, KR1994-0000847A.
(Continued)

*Primary Examiner* — William H Rodriguez
*Assistant Examiner* — Kyle Robert Thomas
(74) *Attorney, Agent, or Firm* — Ostrolenk Faber LLP

(57) ABSTRACT

The present invention relates to an igniter assembly, including a blast tube provided with a supporting part formed in a cylindrical shape, and an aft-closure part having front and rear sides through which igniter combustion gas is emitted, an igniter disposed adjacent to the rear side of the aft-closure part and storing ignition pellet therein, and a blast tube stopper formed in a shape surrounding the supporting part, accommodating the igniter, and coupled to the rear side of the aft-closure part, wherein the aft-closure part includes a plurality of holes through which igniter combustion gas is emitted.

9 Claims, 2 Drawing Sheets

(51) Int. Cl.
*F02K 9/08* (2006.01)
*F42B 3/04* (2006.01)
*F42C 19/08* (2006.01)
*B64G 1/40* (2006.01)

(58) Field of Classification Search
USPC .......................................... 102/202, 374, 380
See application file for complete search history.

(56) References Cited

U.S. PATENT DOCUMENTS

| | | | | |
|---|---|---|---|---|
| 4,318,271 | A * | 3/1982 | Doukakis | F02K 9/84 60/232 |
| 4,999,997 | A * | 3/1991 | Grosgebauer | F02K 9/28 102/290 |
| 2008/0143058 | A1* | 6/2008 | Wallace | F02K 9/978 277/643 |
| 2010/0269484 | A1* | 10/2010 | Baker | F02K 9/563 60/204 |
| 2013/0111874 | A1* | 5/2013 | Kawadu | F02K 9/08 60/256 |

FOREIGN PATENT DOCUMENTS

| | | |
|---|---|---|
| KR | 10-0668804 B1 | 1/2007 |
| KR | 10-0988770 B1 | 10/2010 |
| KR | 10-2011-0088652 A | 8/2011 |
| KR | 10-1192203 B1 | 10/2012 |

OTHER PUBLICATIONS

KR10-2017-0008802 *Notice of Accelerated Examination Decision*—dated Jan. 26, 2017 (with translation).
KR10-2017-0008802 *Office Action*—dated Mar. 13, 2017 (with translation)—with cited references: KR10-0988770B1, KR10-2011-0088652A.
KR10-2017-0008802 *Notice of Allowance*—dated May 15, 2017 (with translation)—with cited references: KR10-0988770B1, KR10-2011-0088652A.

\* cited by examiner

ASSEMBLY INCLUDING AFT END IGNITER FOR ROCKET MOTOR

CROSS-REFERENCE TO RELATED APPLICATION

Pursuant to 35 U.S.C. § 119(a), this application claims the benefit of earlier filing date and right of priority to Korean Application No. 10-2017-0008802, filed on Jan. 18, 2017, the contents of which is incorporated by reference herein in its entirety.

BACKGROUND OF THE INVENTION

1. Field of the Invention

This specification relates to an assembly including an aft end igniter for a rocket motor.

2. Background of the Invention

A rocket motor (propulsion engine) using solid propellants as fuel consists of an igniter, a combustion tube, a propellant grain, a blast tube, a nozzle and the like. Of the components, the igniter is classified into a fore-end igniter and an aft-end igniter depending on a position where the igniter is assembled.

Generally, the solid propellant is shaped like a hollow cylindrical shape. Providing a combustion surface that is designed by using various shapes of grains penetrating through a center thereof in a lengthwise direction. Combustion gases generated are thus discharged to a nozzle to generate thrust. In this case, an igniter is installed at the front of a propulsion engine, which is opposite to the nozzle, so that the propellant is ignited by high-temperature and high-pressure gas, generated by the igniter, passing through the penetrated cylindrical propellant. This type of ignition is referred to as fore-end ignition.

On the other hand, there is a case where one end surface of a cylindrical propellant is used as a combustion surface, without holes formed through a lengthwise central axis of the cylindrical propellant. In particular, this is frequently used for a propulsion engine which requires for constant thrust for a long term of time. The propellant is burnt, starting from the combustion surface close to a nozzle, and thus the combustion surface moves forward as a time elapses. This method is referred to as end burning. The end burning type propulsion engine cannot employ the fore-end ignition because the propellant is filled from the front of a combustion tube to the vicinity of the nozzle. A variety of aft-end igniters have been invented for such propulsion engine. When an igniter is not attached to a front dome, it is attached to a rear dome In this instance, a blast tube is mounted to the igniter such that the igniter can be detached after ignition. However, when the blast tube is relatively long, the function of the igniter may be lowered.

To solve this problem, the igniter is attached to the rear dome using an adhesive member. However, the adhesive member is made of an organic material or the like, an adhesive force thereof may be lowered due to heat or the like.

SUMMARY OF THE INVENTION

Therefore, an aspect of the detailed description is to provide an aft-end igniter for a rocket motor, capable of being mounted irrespective of a size of a nozzle throat, and the length of the blast tube.

To achieve these and other advantages and in accordance with the purpose of this specification, as embodied and broadly described herein, there is provided an igniter assembly, including a blast tube provided with a supporting part formed in a cylindrical shape, and an aft-closure part having front and rear sides through which gas is emitted, an igniter disposed adjacent to the rear side of the aft-closure part and storing ignition pellet therein, and a blast tube stopper formed in a shape surrounding the supporting part, and accommodating the igniter, the blast tube stopper being coupled to the rear side of the aft-closure part, wherein the aft-closure part comprises a plurality of holes through which igniter gas is emitted.

As one embodiment disclosed herein, the aft-closure part may include a plurality of holes arranged in a radial form, and each of the plurality of holes may be formed in a T-like shape with a hole therethrough.

As one embodiment disclosed herein, the igniter may include an igniter case provided with case partitions defining a plurality of storage spaces for storing the ignition pellet therein.

As one embodiment disclosed herein, the igniter assembly may further include an auxiliary ignition powder (booster charge) stored in one of the plurality of storage spaces to prevent an ignition delay.

As one embodiment disclosed herein, the igniter may further include a case cover covering the igniter case.

As one embodiment disclosed herein, the case cover may be made of urethane foam.

As one embodiment disclosed herein, the blast tube stopper may further include a mounting portion for accommodating the igniter therein, and the blast tube stopper may include a heat-resistant material formed to surround the mounting portion.

As one embodiment disclosed herein, the blast tube stopper may further include an initiator installing hole disposed on the mounting portion such that an initiator or an ignition safety device is installed.

As one embodiment disclosed herein, the blast tube stopper may further include a coupling hole formed on the mounting portion such that a pressure sensor for detecting combustion pressure is installed.

According to the present invention, an aft-end igniter may be disposed on an outer surface of a blast tube, to prevent an igniter structure without being burnt, and an initiator or an ignition safety device can freely be detached from outside.

By fixing the igniter to the outer surface of the blast tube, ignition powder can be completely burnt, thereby enhancing efficiency in view of ignition energy. Accordingly, combustion gas of igniter can be evenly transferred, and also the igniter can be located at an area adjacent to a propellant even without using an adhesive member or the like.

Also, since the igniter is protected using an urethane case, the igniter can be protected from heat in a dual manner by the case and a heat-resistant material of a blast tube stopper, thereby being applied at a relatively low temperature.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
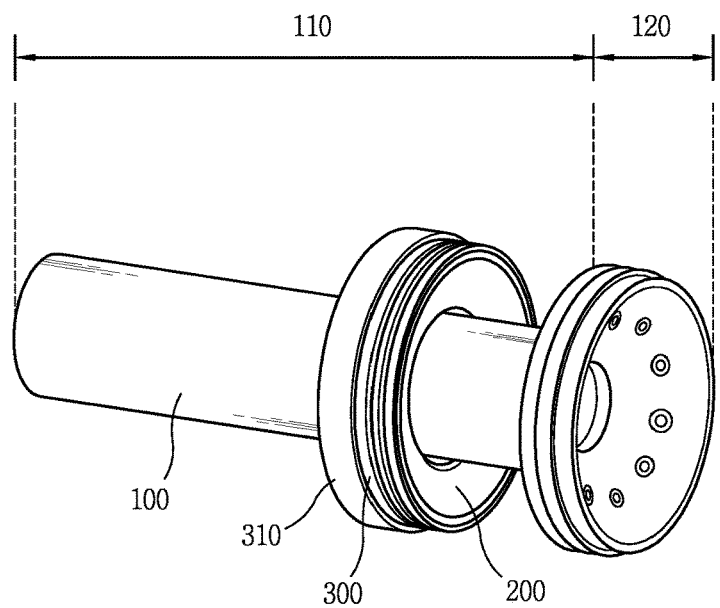
FIG. 1 is a view illustrating an igniter assembly with a disassembled aft-end igniter for a rocket motor, viewed from one direction.

Hereinafter, an igniter assembly according to the present invention will be described in detail with reference to the drawings. In this specification, the same/like reference numerals are given to the same/like reference numerals in different embodiments, and redundant description will be omitted. A singular representation disclosed herein may include a plural representation unless it represents a definitely different meaning from the context.

In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

FIG. 1 is a view illustrating an igniter assembly with a disassembled aft-end igniter for a rocket motor, viewed from one direction.

Referring to FIG. 1, the igniter assembly 1000 includes a blast tube 100, an igniter 200, and a blast tube stopper 300. The igniter 200 is mounted on one area of the blast tube 100 by the blast tube stopper 300.

The blast tube 100 includes a supporting part 110 and a aft-closure part 120. The igniter 200 is installed in inside of the space formed by a toroidal shape aft-closure part 120. The aft-closure part 120 is formed to be gradually narrowed toward the blast tube 100. An inner space of the blast tube 100 is widened to be spaced apart from the aft-closure part 120.

The igniter 200 stores ignition pellet therein.

The aft-closure part 120 may have a circular outer circumference, and may have an oblique surface converging toward a center. However, a front surface of the aft-closure part 120 along which gas is emitted may be a curved surface. The front surface of the aft-closure part 120 is defined as a surface along which igniter gas is emitted, and a rear surface thereof is defined as a surface opposite to the front surface.

Figure 2:
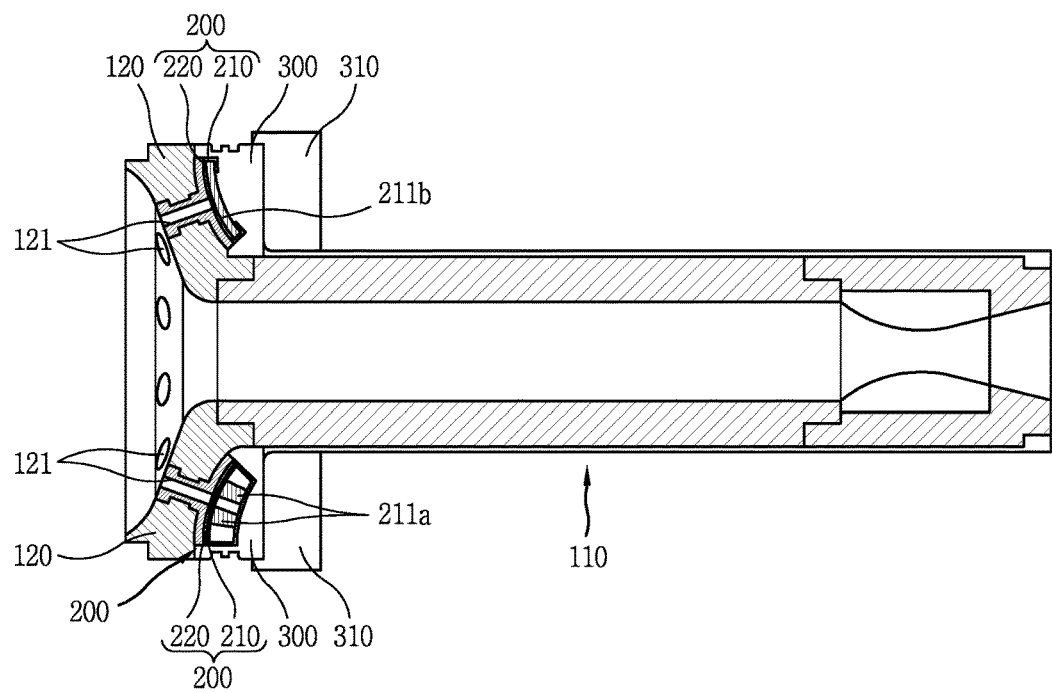
FIG. 2 is a sectional view of the igniter assembly with the aft end igniter mounted therein.
Figure 3:
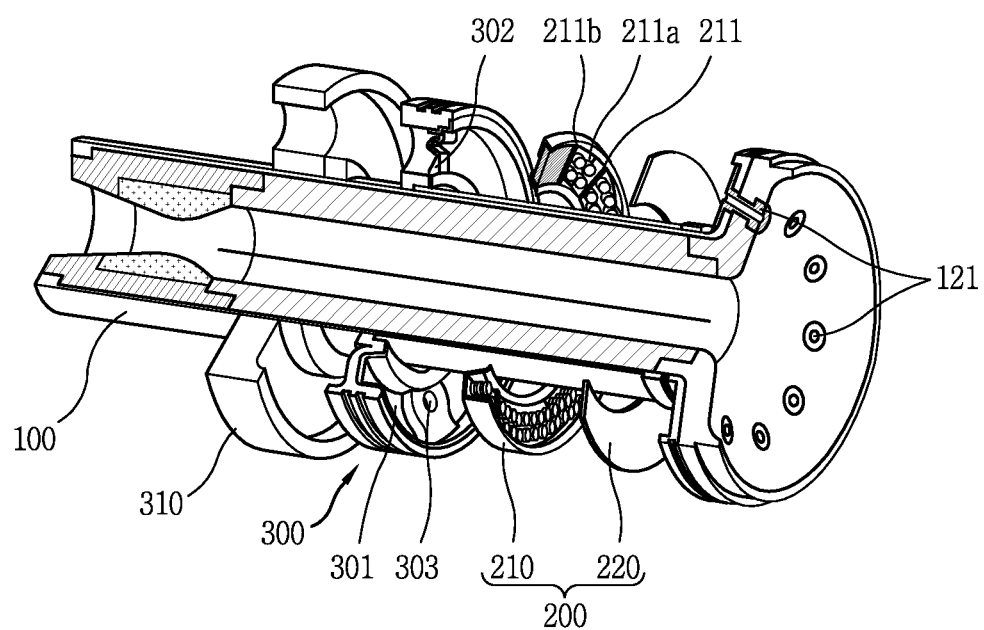
FIG. 3 is a disassembled sectional view of each component of a blast tube, a blast tube stopper and the igniter.

FIG. 2 is a sectional view of the igniter assembly with the aft-end igniter mounted therein, and FIG. 3 is a disassembled sectional view illustrating each component of the blast tube, the blast tube stopper and the igniter.

As illustrated in FIGS. 2 and 3, the aft-closure part 120 includes a plurality of outlet holes. The plurality of outlet holes are arranged at specific intervals to surround a central region of the aft-closure part 120. The aft-closure part 120 further includes outflow tubes 121 inserted into the plurality of outlet holes, respectively. Each of the plurality of outflow tubes 121 includes a hole through which the igniter gas flows in a direction that the outlet hole is formed. The plurality of outflow tubes 121 may be arranged in a radial form so that combustion gas of the igniter can be efficiently transferred to a rocket motor propellant.

Each of the outflow tubes 121 is preferably made of an insulating material such as rubber. The outflow tubes 121 has a T-like shape and the hole formed through the outflow tubes 121 has a specific diameter. The specific diameter is set in a manner that the ignition pellet is discharged through the outflow tubes 121 without being completely burnt.

A heat-resistant cap or the like may be provided in the hole, and in this case, deterioration in performance caused when the igniter is exposed to an extreme temperature environment can be prevented.

The igniter 200 is disposed on one surface of the aft-closure part 120 into which the outflow tubes 121 are inserted. The igniter 200 includes an igniter case 210 and a case cover 220. The igniter case 210 may be made of urethane foam or the like, so as to have improved air-tightness and insulation property.

The igniter case 210 has a toroidal shape surrounding the supporting part 110. The igniter case 210 includes case partitions 211 defining a plurality of storage spaces for storing ignition pellet therein. For example, ignition pellet 211a stored in the igniter case 210 may correspond to a pill type $BKNO_3$. In this case, a burning time of an ignition agent may be maintained for a predetermined time.

Meanwhile, at least one storage space of the plurality of storage spaces may be filled with an auxiliary ignition agent 211b which is in a form of powder or granule. Therefore, it may be possible to prevent an ignition delay from occurring when the ignition agent is ignited using energy supplied by an initiator or the like.

The ignition powder is stored in each of the plurality of spaces defined by the case partitions 211. Accordingly, the ignition powder or the auxiliary ignition agent can be prevented from leaning to one side during transportation.

The igniter case 210 in which the ignition powder 211a and the auxiliary ignition agent 211b are stored is bonded to the case cover 220 to form the integral igniter 200. The integral igniter 200 is then mounted on the blast tube stopper 300.

The blast tube stopper 300 has a toroidal shape surrounding the supporting part 110. The blast tube stopper 300 is provided with a mounting portion 301 formed in a manner of recessing one surface thereof. The igniter case 210 is inserted into the mounting portion 301.

Referring to FIG. 2, a height of the igniter case 210 and a thickness of the blast tube stopper 300 are not constant. For example, one area of the igniter case 210, in which the auxiliary ignition agent 211b is stored, has a relatively thin (short) height. Also, the mounting portion 301 of the blast tube stopper 300, in which the one area of the igniter case 210 is accommodated, is made thin and the blast tube stopper 300 itself is made thick. A coupling structure or a sensor unit may be provided at the blast tube stopper 300 in which the one area of the igniter case 210 is accommodated.

In comparison, another area of the igniter case 210 in which the ignition pellet 211a is stored is formed relatively high (thick). The mounting portion 301 of the blast tube stopper 300, in which the another area of the igniter case 210 is accommodated, is made deep and the blast tube stopper 300 itself is made thin.

The blast tube stopper 300 further includes a heat resistant material coated on one surface thereof which forms the mounting portion 301. Even though the blast tube stopper 300 is exposed due to combustion gas of the propulsion engine after the combustion of the igniter, the heat resistant material can minimize a problem that a temperature of the blast tube stopper 300 increases or the blast tube stopper 300 bursts.

An initiator installing portion 302 is formed on the one area of the mounting portion 301 of the blast tube stopper 300. The installing portion 302 is preferably provided on the area where the auxiliary ignition agent 211b is disposed and the mounting portion 301 of the blast tube stopper 300 is made thin.

An initiator or an ignition safety device may be coupled to the installing portion 302. Since the coupling portion 302 is screwed and has an O-ring mounting surface, the initiator or the ignition safety device can be separated or installed as needed. The installing portion 302 may be formed to face one storage space in which the auxiliary ignition powder bag is stored when the igniter case 210 is mounted on the blast tube stopper 300.

Here, the initiator and the ignition safety device supply the energy for igniting the ignition powder and pellet. Accordingly, the initiator or the ignition safety device can be disposed adjacent to the auxiliary ignition powder, which may result in preventing an unnecessary ignition delay.

A pressure sensor coupling hole 303 is formed on one area of the mounting portion 301 of the blast tube stopper 300. A pressure sensor for measuring combustion pressure of the igniter and the propulsion engine is mounted to the pressure sensor installing hole 303. However, when the combustion pressure measurement is not required, the pressure sensor installing hole 303 may be provided with an NPT screw structure such that a cap or the like can be inserted into the pressure sensor installing hole 303. Accordingly, when the pressure sensor is not disposed, air-tightness can be maintained.

The blast tube stopper 300 on which the igniter 200 is disposed is closely adhered on one surface of the aft-closure part 120 and fixed to the blast tube 100 by an additional coupling device.

A coupling member 310 may be mounted to the rear of the blast tube stopper 300 and connected to an additional structure. The coupling member 310 overlaps one area of an outer circumference of the blast tube stopper 300, and is formed in a circular toroidal shape to support the rear of the blast tube stopper 300.

The configuration and method described in the foregoing embodiments may not be limitedly applied to the aft-end igniter described above, but all or some of the embodiments may be selectively combined so that various modifications can be made.

What is claimed is:

1. An igniter assembly, comprising:
    a supporting part formed in a cylindrical shape and having a supporting part hole penetrating in an axial direction of the supporting part;
    an aft-closure part with a first end provided at one end of the supporting part and formed to increase in diameter in a direction away from the supporting part;
    an igniter disposed adjacent to the aft-closure part and storing an ignition pellet therein; and
    a blast tube stopper formed in a shape surrounding the supporting part, and accommodating the igniter, the blast tube stopper being coupled to the aft-closure part, wherein the aft-closure part comprises:
    an inner circumferential surface facing a rocket motor propellant;
    an outer circumferential surface disposed to face the igniter; and
    a plurality of outflow tubes which are inserted into the aft-closure part to pass through the outer circumferential surface and the inner circumferential surface to discharge igniter combustion gas of the ignition pellet toward the rocket motor propellant,
    wherein the aft-closure part is formed to be on a shared center axis with the supporting part hole, and wherein the first end of the aft-closure part is of the same size and shape as the one end of the supporting part, so that gas produced by combustion of the rocket motor propellant by the igniter combustion gas is injected in a direction toward another end of the supporting part through the supporting part hole, and
    wherein each of the plurality of outflow tubes is formed in a T shape so as to cover at least a portion of the outer circumferential surface.

2. The assembly of claim 1, wherein the plurality of outflow tubes are arranged in a radial form.

3. The assembly of claim 1, wherein the igniter comprises an igniter case provided with case partitions defining a plurality of storage spaces for storing the ignition pellet therein.

4. The assembly of claim 3, further comprising an auxiliary ignition agent stored in one of the plurality of storage spaces to prevent an ignition delay.

5. The assembly of claim 3, wherein the igniter further comprises a case cover covering the igniter case.

6. The assembly of claim 5, wherein the case cover is made of urethane foam.

7. The assembly of claim 1, wherein the blast tube stopper further comprises a mounting portion for accommodating the igniter therein, and
    wherein the blast tube stopper comprises a heat-resistant material formed to surround the mounting portion.

8. The assembly of claim 7, wherein the blast tube stopper further comprises a coupling member disposed on the mounting portion such that an initiator or an ignition safety device is installed.

9. The assembly of claim 7, wherein the blast tube stopper further comprises a installing hole formed on the mounting portion such that a pressure sensor for detecting combustion pressure is installed.

* * * * *